May 3, 1960     R. W. GREGORY ET AL     2,934,895
DUAL CYCLE ENGINE DISTRIBUTOR CONSTRUCTION
Filed Sept. 15, 1958     4 Sheets-Sheet 1
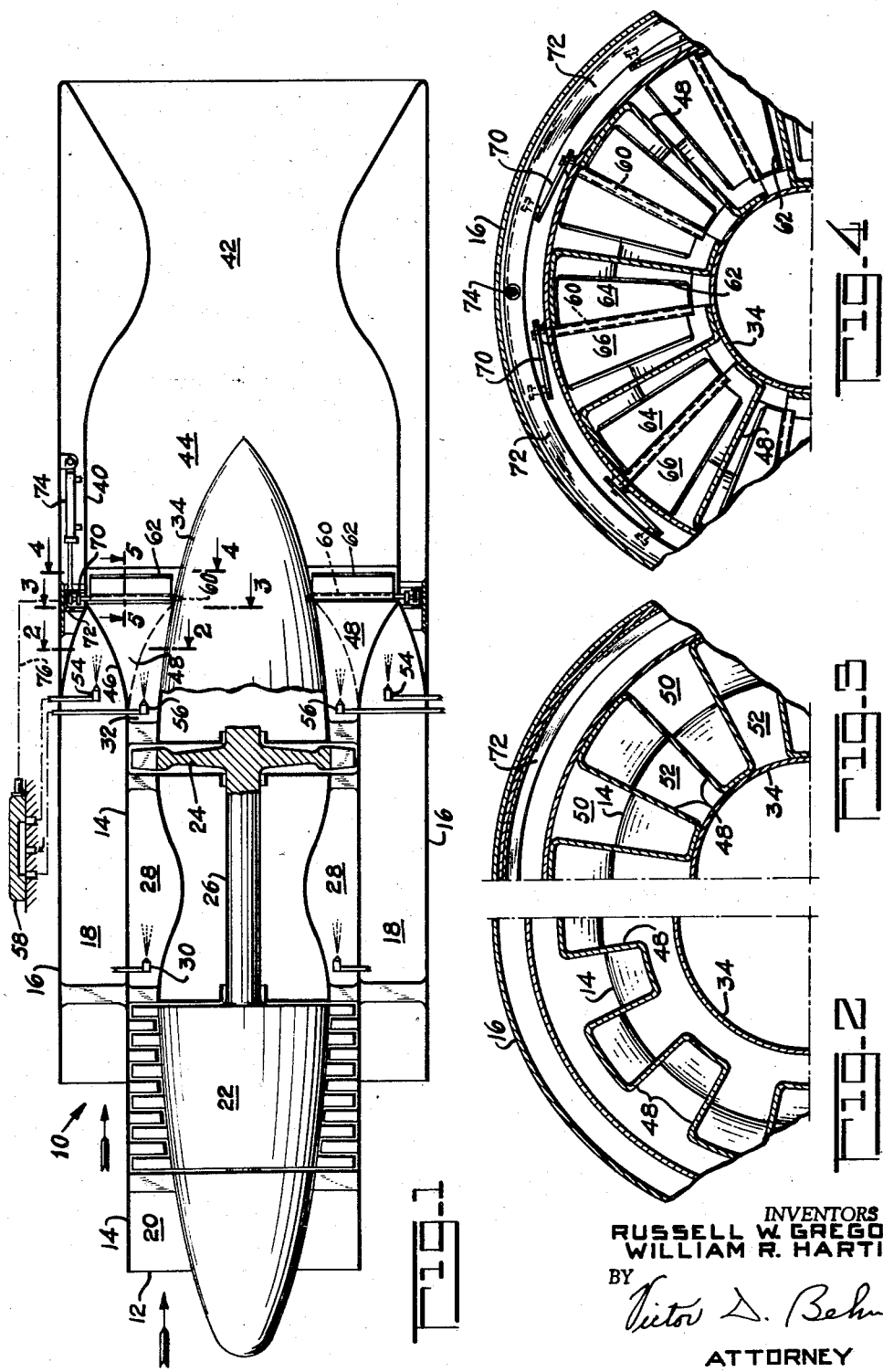
INVENTORS
RUSSELL W. GREGORY
WILLIAM R. HARTILL
BY
ATTORNEY

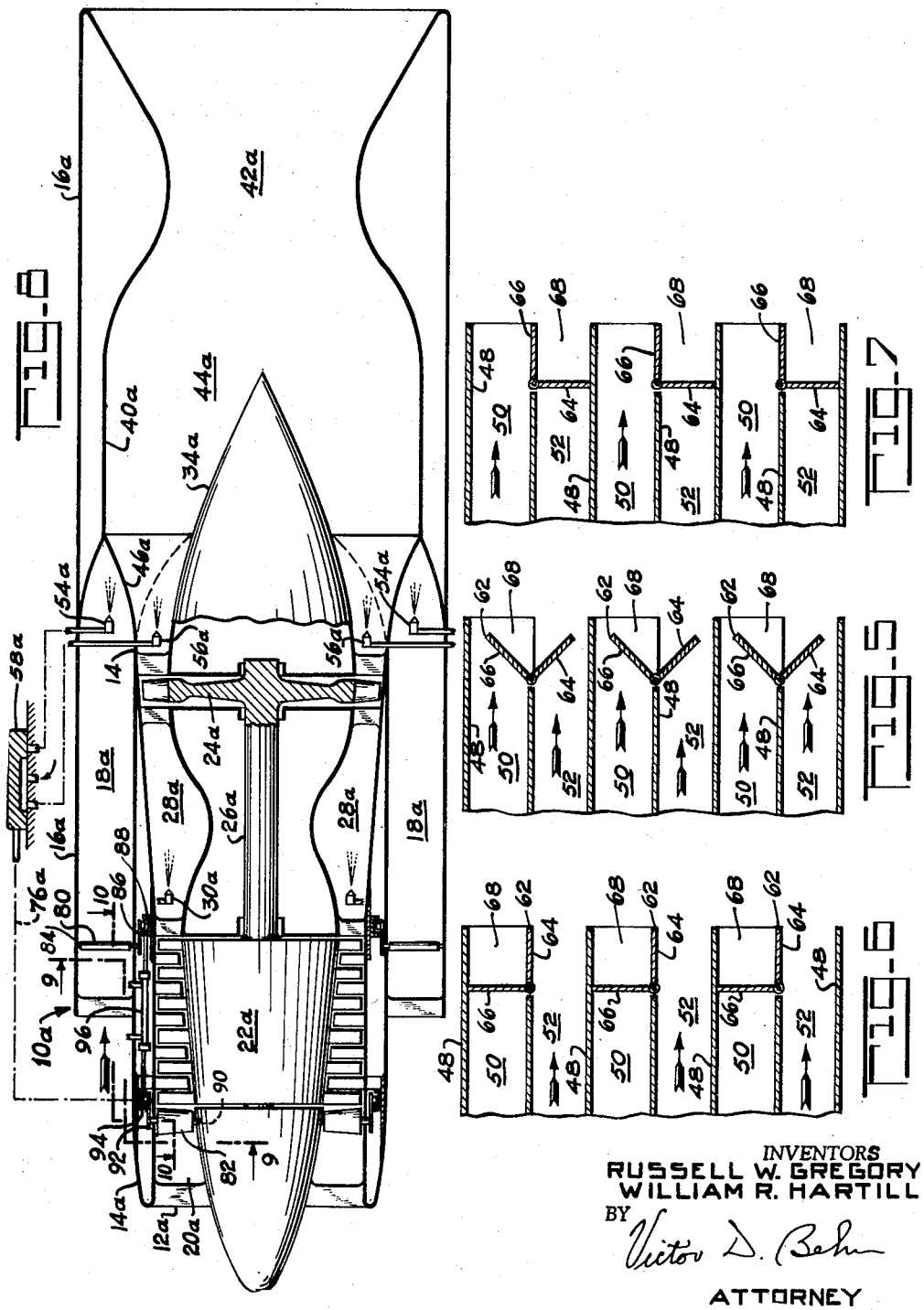

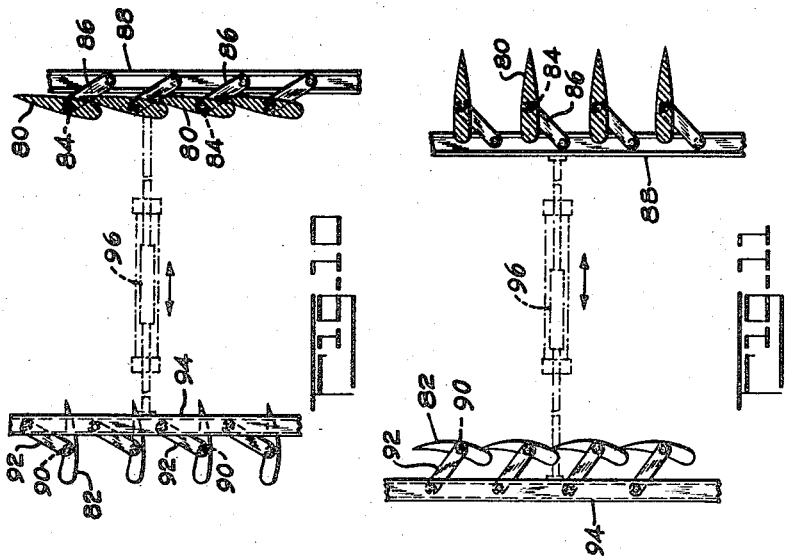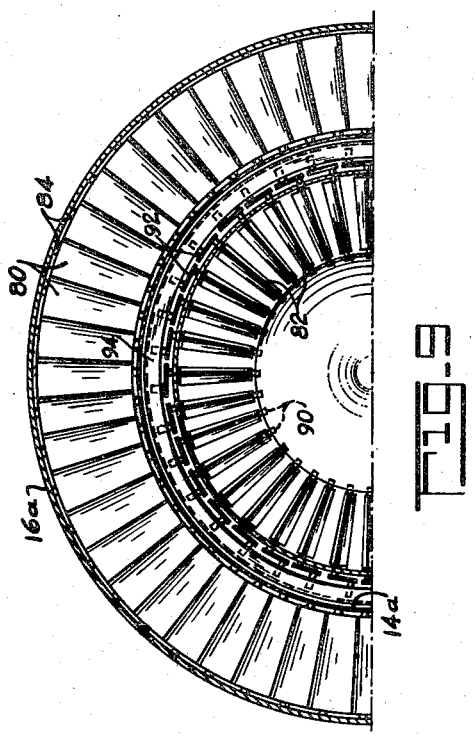

May 3, 1960    R. W. GREGORY ET AL    2,934,895
DUAL CYCLE ENGINE DISTRIBUTOR CONSTRUCTION
Filed Sept. 15, 1958    4 Sheets-Sheet 4
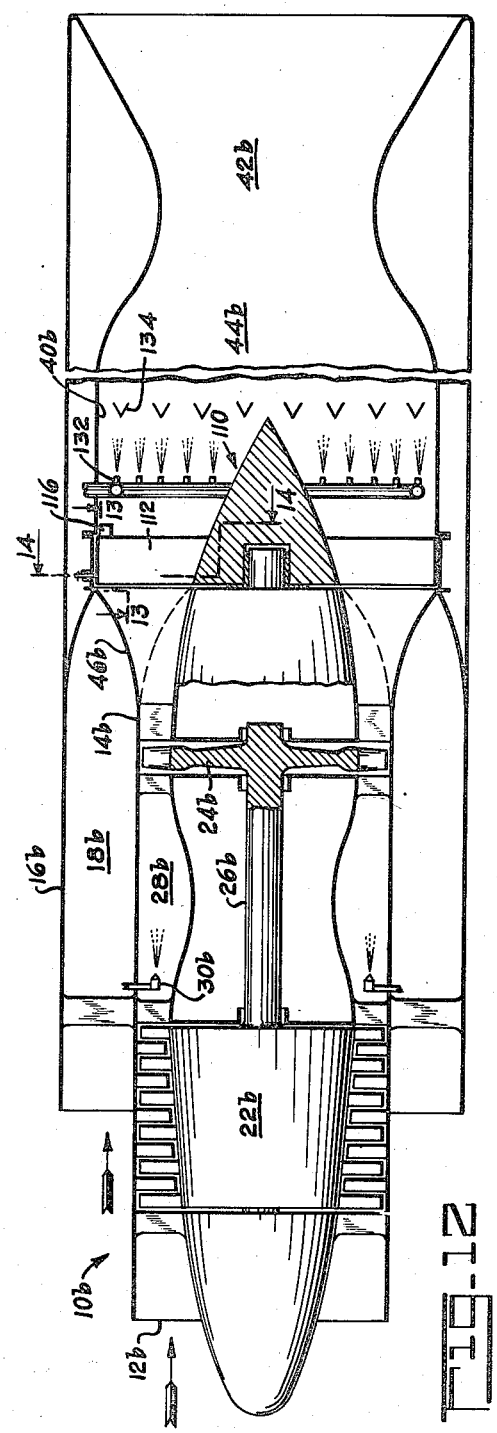
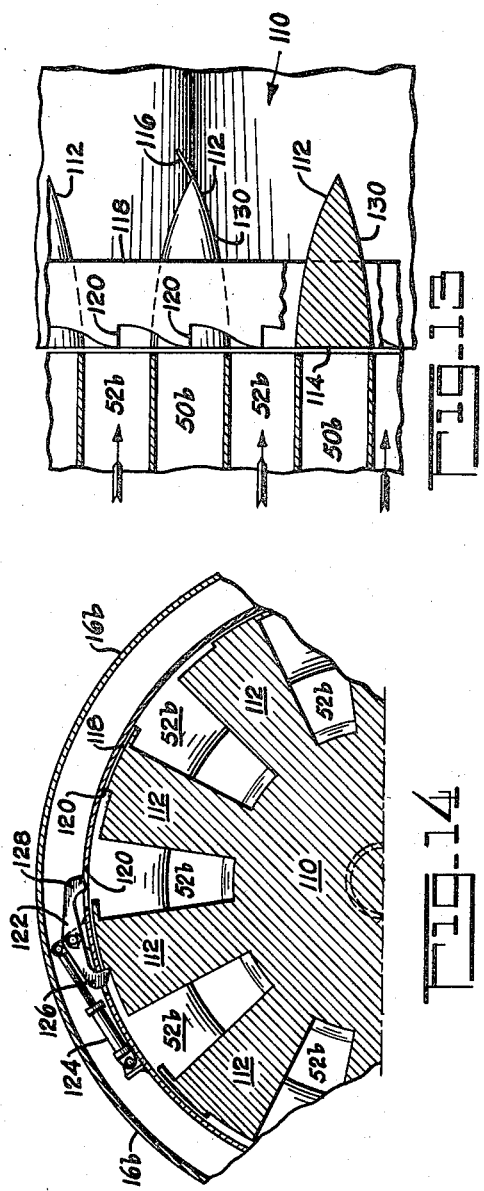
INVENTORS
RUSSELL W. GREGORY
WILLIAM R. HARTILL
BY
*Victor D. Behr*
ATTORNEY United States Patent Office 2,934,895
Patented May 3, 1960

2,934,895

DUAL CYCLE ENGINE DISTRIBUTOR CONSTRUCTION

Russell W. Gregory, Allendale, and William R. Hartill, Passaic, N.J., assignors to Curtiss-Wright Corporation, a corporation of Delaware Application September 15, 1958, Serial No. 761,112

15 Claims. (Cl. 60—35.6)

This invention relates to air breathing jet engines and is particularly directed to a compound power plant comprising a combination of a ramjet engine and a turbojet engine.

Such a compound power plant is known as a dual-cycle engine and is disclosed in Patent No. 2,641,902. As there shown the power plant includes a common combustion chamber which can function as the afterburner combustion chamber during operation of the turbojet and as the ramjet combustion chamber during ramjet operation. The turbojet exhaust and the ramjet inlet duct merge into this common combustion chamber.

An objection of this invention comprises the provision of a novel arrangement in which a distributor device which supplies either the turbojet exhaust or the ramjet air to said common combustion chamber also functions as the flameholder for said combustion chamber.

A further object of the invention comprises the provision of said novel distributor device in which said device includes valve means which functions as the flameholder during the transition period.

A still further object of the invention comprises the novel combination of such a distributor device and a valve mechanism.

Other objects of the invention will become apparent upon reading the annexed detailed description in connection with the drawing in which:

Fig. 1 is a schematic axial sectional view of a dual-cycle engine embodying the invention;

Figs. 2, 3, 4 and 5 are sectional views taken along lines 2—2, 3—3, 4—4 and 5—5 respectively of Fig. 1;

Figs. 6 and 7 are views similar to Fig. 5 but illustrating other positions of the valve member;

Fig. 8 is a view similar to Fig. 1 but illustrating a modified construction;

Figs. 9 and 10 are sectional views taken along lines 9—9 and 10—10 respectively of Fig. 8.

Fig. 11 is a view similar to Fig. 10 but illustrating the valve mechanism in another position;

Fig. 12 is another view similar to Fig. 1 and illustrating a further modification of the invention; and Figs. 13 and 14 are sectional views taken along lines 13—13 and 14—14 respectively of Fig. 12.

Referring first to Figs. 1–7 of the drawing a dual cycle power plant, indicated by reference numeral 10, is illustrated as comprising a turbojet engine 12 with the outer housing 14 of the turbojet being co-axially surrounded by an annular shell 16 providing an annular air intake path 18 for the ramjet engine.

The turbojet engine 12 comprises an annular air intake passage 20, an air compressor 22, a turbine 24 drivably connected to the compressor 22 by a shaft 26 and a combustion chamber 28 supplied with compressed air by the compressor 22 and fuel by fuel nozzles 30 for combustion in said chamber. The combustion gases from the chamber 28 drive the turbine 24 and exhaust thru the annular discharge path 32 between the turbojet tailcone 34 and the outer wall 14 of the turbojet engine.

Downstream of the turbojet engine 12 the dual cycle power plant has a duct 40 with an exhaust nozzle 42 at its discharge end. The duct 40 provides a chamber 44 which at one time functions as an afterburner combustion chamber for the turbojet and at another time functions as the ramjet combustion chamber. For this purpose the chamber 44 is arranged for communication with both the ramjet inlet path 18 and the turbine exhaust path 32.

A distributor device 46 is disposed between the combustion chamber 44 and both the ramjet inlet path 18 and the turbine exhaust path 32. The turbojet annular housing 14 forms a common wall between the ramjet inlet path 18 and the turbine exhaust path 32 and the distributor device 46 in effect constitutes a continuation of this common annular wall 14. This common annular wall is provided with radially extending corrugations 48 which progressively increase in radial depth so that at the downstream end of the distributor device these corrugations extend radially across the annular upstream end of the duct 40. These corrugations 48 form circumferentially-spaced passages 50 which communicate with the ramjet inlet path 18 and also form alternate circumferentially-spaced passages 52 which communicate with the turbine exhaust path 32.

This distributor device 46 facilitates distribution of the ramjet air across the duct 40 during ramjet operation and distribution of the turbine exhaust across said duct during turbojet operation. In either case a flameholder structure is necessary in the chamber 44 to stabilize combustion therein. Ramjet and afterburner fuel are introduced upstream from the distributor device 46. Thus fuel nozzles 54 are provided for supplying fuel into the passages 50 for combustion in the chamber 44 during ramjet operation. Additional fuel nozzles 56 are provided for supplying fuel into the passages 52 for combustion in the chamber 44 during turbojet operation. Valve means, indicated at 58, are provided for controlling the supply of fuel to either of the nozzles 54 and 56 from a supply line 60. The valve means 58 is illustrated in an intermediate position in which fuel is supplied to both sets of nozzles 54 and 56. Guide vanes (not shown) preferably are provided in each of the ramjet passages 50 to help distribute the ramjet air radially across said passages and similar guide vanes (not shown) preferably are provided in each of the turbojet passages 52.

In a dual cycle engine no air flows thru the turbojet engine during ramjet operation. Likewise no air flows thru the ramjet inlet path during turbojet operation. This requires valving to shut off flow thru one or the other of these paths. In the present invention this valving is combined with the aforementioned flameholder for the chamber 44 into a single mechanism at the downstream end of the distributor device. For this purpose alternate walls of the corrugations 48 are shortened axially at their downstream ends and a hinge pin 60 is disposed radially along such shortened wall. A valve member 62 shaped as a V-gutter has its apex disposed along and secured to said hinge pin 60. As illustrated in Figs. 5, 6 and 7 the angle between the sides 64 and 66 of said V-shaped valve member preferably is 90° and each side has a length, at right angles to its hinge axis, approximately equal to the width of the adjacent passages 50 and 52. With this construction, each valve member 62 can be swung to its one extreme position of Fig. 6 in which its side 66 closes the adjacent ramjet passages 50 or can be swung to its position of Fig. 7 in which its side 64 closes the adjacent turbojet passage 52. In Figs. 1 and 5 the valve members 62 are midway between said extreme positions.

When each valve member 62 is in its position of Fig. 6 to close an adjacent ramjet passage 50, its sides 64 and 66 also cooperate with the adjacent wall of said passage 50 to form a U-shaped channel space 68 which opens in a downstream direction. Thus the channel space 68 between the sides 64 and 66 of each valve member 62 form a sheltered region over the downstream end of said ramjet passage 50. During turbojet afterburner operation, the combustion mixture flowing through the turbojet passages 52 produces turbulence on the downstream side of the sheltered regions 68 as said mixture discharges into the chamber 44. This turbulence causes circulation of a portion of the afterburner combustion mixture back into the sheltered regions whereby said regions can function as flameholders to provide stable combustion in the chamber 44 during turbojet afterburner operation.

Likewise when each valve member 62 is in its position of Fig. 7 for ramjet operation it closes an adjacent turbojet passage 52 and its sides 64 and 66 cooperate with the adjacent wall of said passage 52 to form again a U-shaped channel space 68 which opens in a downstream direction into the chamber 44. As in Fig. 6, each channel space 68 forms a sheltered region but this time over the closed downstream end of a turbojet passage 52. These sheltered regions 68 now function as flameholders for combustion in the chamber 44 during ramjet operation. This flameholder function of the sheltered regions 68 during ramjet operations results from the turbulence produced in the chamber 44 downstream of said regions as the ramjet combustion mixture discharges into said chamber from the passages 50. Thus the chambers 68 have substantially the same flameholder function and operation during ramjet operation as during turbojet afterburner operation.

It is apparent from Fig. 5 that during the transition period as the valve members 62 are moved from their position of Fig. 6 for turbojet operation to their position of Fig. 7 for ramjet operation or back again, the space 68 between the sides 64 and 66 of each valve member 62 continues to provide a sheltered region for the combustion mixture flowing thru either or both of the passages 50 and 52. In this way the valve member spaces 68 are sheltered regions which can function as continuous sources of burning mixture for the chamber 44 during transition from ramjet to turbojet operation or vice versa as well as during ramjet or turbojet operation. Suitable igniter means (not shown) is disposed immediately adjacent to the downstream sides of the valve members 62.

In order to move the valve members 62 as described, each valve member is provided with a crankarm 70 secured to its hinge pin 60. Each crankarm has its crankpin end received within an annular channel 72 so that axial motion of the channel 72 is effective to swing each valve member 62 about its hinge pin axis. Fluid motor means 74 is provided for axially moving the annular channel. Suitable stops are provided for the annular channel 72 or in the motor means 74 to limit motion of the valve members between their extreme positions of Figs. 6 and 7.

The valve members 62 and fuel valve means 58 preferably are interconnected as schematically indicated at 76 so that when fuel is supplied only to the ramjet fuel nozzles 54 the valve members 62 are their position of Fig. 7 for closing the turbojet passages 52 and when fuel is supplied only to the turbojet afterburner fuel nozzles 56 the valve members 62 are their position of Fig. 6 for closing the ramjet passages 50.

In a dual cycle engine the valve means for shutting off fluid flow thru the ramjet engine or fluid flow thru the turbojet engine generally is disposed at the upstream ends of said engines. That is, in lieu of the valve means 62 suitable valve means may be provided at the upstream ends of the ramjet and turbojet engines. Such a modification is illustrated in Figs. 8–11. For ease of understanding, the parts of Figs. 8–11 have been designated by the same reference numerals as the corresponding parts of Figs. 1–7 but with a subscript $a$ added thereto.

In lieu of the valve members 62, in Figs. 8–11 valve members 80 are provided at the inlet end of the ramjet engine and valve members 82 are provided at the inlet end of the turbojet engine.

The ramjet valve members 80 comprise a plurality of circumferentially-spaced strut like members which extend radially across the ramjet inlet 18, each of said members having a hinge pin 84 with a crankarm 86 having its crankpin received within an annular channel 88. The arrangement is such that axial movement of the channel 88 is effective to swing the ramjet valve members 80 about the axes of their hinge pins 84.

The turbojet valve members 82 similarly are circumferentially-spaced and extend radially across the turbojet inlet 20a. Each valve member 82 has a hinge pin 90 with a crankarm 92 having its crankpin received within an annular channel 94 so that axial movement of the channel 94 is effective to swing the valve members 80 about the axes of their hinge pins 90.

The channel members 88 and 94 are connected to a common motor 96 so that said motor is effective to move the channel members 88 and 94 simultaneously to the right to the position of Figs. 8, 9 and 10 thereby moving the ramjet valve members 80 to their closed position and moving the turbojet valve members 82 to their open position. Likewise operation of the channel members 88 and 94 to the left to the position of Fig. 11 simultaneously moves the ramjet valve members 80 to their open position and the turbojet valve members 82 to their closed position. Preferably the turbojet valve members 82 have a curved airfoil shape so that these members also function as turning vanes at the entrance to the turbojet compressor.

With the valve members 80 and 82 in their position of Figs. 8–10, the ramjet valve members 80 are closed and the turbojet valve members 82 are open so that there is no flow thru the distributor ramjet passages 50a. Hence in this position of the valve members 80 and 82 the distributor ramjet passages 50a in effect function as sheltered regions for the combustible mixture flowing thru the turbojet passages 52a. Likewise when the valves members 80 and 82 are in their other extreme position of Fig. 11, the distributor turbojet passages 52a now have no flow therethru so that these passages 52a in effect function as sheltered regions for the combustible mixture flowing thru the ramjet passages 50a. Hence, for either turbojet or ramjet operation the downstream end of the distributor 46a will function as a flameholder for combustion in the chamber 44a.

The construction and operation of Figs. 8–11 are otherwise like that of Figs. 1–7 so that no further description of Figs. 8–11 appears to be necessary.

As compared with Figs. 1–7, the construction of Figs. 8–11 permits the use of more conventional transition valving means for a dual cycle engine. Figs. 8–11, however, has the disadvantage that no flameholder action is provided during the transition period between ramjet and turbojet operations. Figs. 1–7 is also preferred because it provides a more compact transition valving arrangement and also prevents circulation of burning gases into the ramjet inlet during turbojet operation and into the turbojet exhaust path during ramjet operation.

In Figs. 1–7 and in Figs. 8–11, the distributor devices 46 and 46a function as a flameholder for combustion downstream therefrom. Said distributor device, however, in combination with suitable valving hereinafter described may be arranged to provide a smooth continuous flow path for either ramjet or turbojet operation. Such an arrangement is illustrated in Figs. 12–14 in which for ease of understanding the parts have been designated by the same reference numerals as the corresponding parts of Figs. 1–7 but with a subscript $b$ added thereto.

In Figs. 12–14 a rotatable valve 110 is coaxially supported at the downstream side of the distributor device 46b. The valve 110 includes a plurality of circumferentially-spaced elements 112 extending radially across the downstream end of the distributor device 46b, there being one valve element 112 for each pair of distributor passages 50b and 52b. Each valve element has a generally triangular cross-section with the base 114 of each element 112 having a width just sufficient to bridge across and close a distributor passage 50b or 52b. The walls of the passages 50b and 52b all terminate in the same radial plane instead of having alternate walls cut back as in Figs. 1–7. The distributor 46a is similar to distributor 46b in this respect.

When the valve 110 is in its position shown in Figs. 13 and 14, its elements 112 are disposed across the ramjet passages 50b to close said passages and leave the turbojet passages 52b open. The valve is arranged to rotate in one direction in steps so that each of its elements 112 is movable from a position closing, as illustrated, a passage 50b to a position closing the adjacent passage 52b and so that its next step will bring said element 112 to a position closing the next passage 50b.

In order to rotate the valve 110 one or more of its elements 112 are provided with vanes 116 in the flow path of the gases flowing between a pair of adjacent valve elements 112 so that the gases impinging on each vane 116 urge the valve 110 rotatively in one direction. An annular shroud 118, across the radially-outer ends of the valve elements 112, has notches forming circumferentially-spaced shoulders 120 for cooperation with a latch member 122. The latch member 122 is tiltable by a motor 124 and in its position of Fig. 14 the left end 126 of the latch engages a notch shoulder 120 to hold the valve 110 against rotation. The motor 124 is operable to tilt the latch member 122 clockwise (Fig. 14) whereby the left end 126 of said latch member moves free of the valve shroud 118 and the right end 128 moves into position for engagement with next notch shoulder 120. As soon as the latch member 122 moves free of the valve shroud 118, the gases impinging on the vanes 116 rotate the valve (counterclockwise as viewed in Fig. 14 or downward as viewed in Fig. 13) until the next notch shoulder 120 engages the right end 128 of the latch member thereby causing the valve 110 to rotate one step to move each valve element 112 from one distributor passage to the next. The motor 124 is then operable to rock the latch member 122 counterclockwise thereby again freeing the valve 110 and permitting it to rotate another step.

In this way the valve 110 can be rotated in steps by the gases flowing through the distributor passages to move each of the valve elements 112 from one distributor passage to the next. The sides 130 of each triangular shaped valve element 112 preferably are curved as illustrated to provide a smooth and gradual increase in area of the flow path between adjacent valve elements 112. This provides for conversion of some of the velocity energy of the gases flowing thru either of the distributor passages 50b or 52b into pressure before entering combustion in the chamber 44b. This pressure recovery makes for more efficient combustion in the chamber 44b.

With the arrangement of Figs. 12–14 the fuel nozzles for supplying fuel to the chamber 44b may now be disposed downstream of the distributor 46b as illustrated at 132 rather than in or upstream of the distributor passages 50b and 52b as in Figs. 1–7 and in Figs. 8–11. With this arrangement of Figs. 12–14 the fuel nozzles 132 are disposed in a slower moving fluid stream so that they offer less drag. Figs. 12–14, however, requires a separate flameholder 134 downstream of the distributor 46b. This has the disadvantage of making the engine longer.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications.

We claim as our invention:

1. An air breathing jet engine comprising a ramjet engine and a turbojet engine having an exhaust first path; said ramjet engine including means providing an annular air inlet second path co-axially surrounding said turbojet engine and its said first path; a duct downstream of said annular ramjet path and turbojet exhaust path and arranged for communication with both said paths; fuel burner apparatus in said duct such that said burner apparatus can operate as a ramjet burner or as an afterburner for the turbojet; a distributor device disposed between said paths and duct for dividing up the flow from one of said paths into a plurality of circumferentially-spaced first passages the discharge ends of which are arranged to open into said duct and for dividing up the flow from the other said path into a plurality of circumferentially-spaced second passages the discharge ends of which are arranged to open into said duct and are circumferentially disposed between the discharge ends of said first passages; and valve means movable relative to said distributor device to a first position for closing said first path and opening said second path to flow therethru and movable to a second position for closing said second and opening said first path to flow therethru.

2. An air breathing jet engine comprising a ramjet engine and a turbojet engine having an exhaust first path; said ramjet engine including means providing an annular air inlet second path co-axially surrounding said turbojet engine and its said first path; a duct downstream of said annular ramjet path and turbojet exhaust path and arranged for communication with both said paths; fuel burner apparatus in said duct such that said burner apparatus can operate as a ramjet burner or as an afterburner for the turbojet; a distributor device disposed between said paths and duct for dividing up the flow from one of said paths into a plurality of circumferentially-spaced first passages the discharge ends of which are arranged to open into said duct and for dividing up the flow from the other said path into a plurality of circumferentially-spaced second passages the discharge ends of which are arranged to open into said duct and are disposed between the discharge ends of said first passages; and valve means disposed at the downstream end of said distributor device and movable relative to said distributor device to a first position for closing said first passages and opening said second passages to flow therethru and movable to a second position for closing said second passages and opening said first passages to flow therethru.

3. An engine as recited in claim 2 in which said valve means, either in its first or its second position provides flow passages of progressively increasing area for the open passages to provide a gradual increase in flow area from said open passages into said duct.

4. An engine as recited in claim 2 and including means responsive to flow thru the open passage for urging the valve means toward its position for opening the other of said passages; and releasable means for holding said valve means in either of its first and second positions.

5. An engine as recited in claim 2 and including means for supplying fuel to said passages upstream of their discharge ends and in which said valve means in either of its first and second positions is arranged to function as a flame-holder for combustion in said duct of the fuel flowing therein thru the open passages.

6. An engine as recited in claim 2 and including means for supplying fuel to said passages upstream of their discharge ends and in which said valve means in either of its first and second positions provides a sheltered region at the downstream end of each closed passage such that said sheltered regions function as flameholders for combustion in said duct of the fuel flowing therein thru the open passages.

7. An engine as recited in claim 6 in which each of said sheltered regions is of U-shaped cross-section and extends radially across the duct with the open side of said region facing downstream into said duct.

8. An engine as recited in claim 2 and including means for supplying fuel to said passages upstream of their discharge ends and in which said valve means comprises a plurality of radially extending V-shaped gutters each mounted for pivotal movement about a radial axis for movement to its first and second positions.

9. An engine as recited in claim 8 in which one side of each V-gutter functions to close one passage in the first position of said valve means and the other side of said gutter functions to close the adjacent passage in the second position of said valve means.

10. An engine as recited in claim 2 and including means for supplying fuel to said passages upstream of their discharge ends and in which said valve means is disposed at the inlet ends of said ramjet and turbojet engines.

11. An air breathing jet engine comprising a ramjet engine and a turbojet engine having an exhaust first path; said ramjet engine including means providing an annular air inlet second path co-axially surrounding said turbojet engine and its said first path; a duct downstream of said annular ramjet path and turbojet exhaust path and arranged for communication with both said paths; fuel burner apparatus in said duct such that said burner apparatus can operate as a ramjet burner or as an afterburner for the turbojet; a distributor device disposed between said paths and duct for dividing up the flow from one of said paths into a plurality of circumferentially-spaced first passages the discharge ends of which open into said duct and for dividing up the flow from the other said paths into a plurality of circumferentially-spaced second passages the discharge ends of which open into said duct and are disposed between the discharge ends of said first passages; the portion of said duct at the discharge ends of said passages being annular and said passages at their discharge ends extending radially across said duct annular portion; and valve means movable, relative to said distributor device, to a first position for closing said first path and opening said second path to flow therethru and movable to a second position for closing said second passages and opening said first passages to flow therethru.

12. An engine as recited in claim 11 in which said valve means comprises a plurality of radially-extending elements each arranged to close one or the other of two adjacent passages by extending across the discharge end of either of said passages.

13. An engine as recited in claim 11 in which said valve means comprises a plurality of radially-extending elements each arranged to close one or the other of two adjacent passages, each said valve element being generally triangular in cross-section with its base being disposed across the passage closed thereby and with its two sides forming smooth continuations of the walls of the adjacent open passages.

14. An engine as recited in claim 11 in which said valve means comprises a plurality of radially-extending elements each arranged to close one or the other of two adjacent passages, each said valve element having a V-shaped cross-section with the apex of its said V-shape being disposed along the downstream edge of the radial wall separating the downstream ends of two adjacent first and second passages; and means supporting each element for pivotal movement about a radial axis along its said apex.

15. An air breathing jet engine comprising a ramjet engine and a turbojet engine having an exhaust first path; said ramjet engine including means providing an air inlet second path having its downstream end disposed adjacent to the downstream end of said first path; a duct downstream of said turbojet and ramjet paths and arranged for communication with both said paths; fuel burner apparatus in said duct such that said burner apparatus can operate as ramjet burner or as an afterburner for the turbojet; a distributor device disposed between said paths and duct for dividing up the flow from one of said paths into a plurality of spaced first passages the discharge ends of which are arranged to open into said duct and for dividing up the flow from the other said path into a plurality of spaced second passages the discharge ends of which are arranged to open into said duct and are disposed between the discharge ends of said first passages; and valve means disposed at the downstream end of said distributor device and movable relative to said distributor device to a first position for closing said first passages and opening said second passages to flow therethrough and movable to a second position for closing said second passages and opening said first passages to flow therethrough.

No references cited.